US00RE48837E

(19) United States
(12) Reissued Patent
Mercer et al.

(10) Patent Number: US RE48,837 E
(45) Date of Reissued Patent: Dec. 7, 2021

(54) ELECTRIC VEHICLE CHARGING DEVICE

(71) Applicant: Volta Charging, LLC, San Francisco, CA (US)

(72) Inventors: Scott A. Mercer, Pacifica, CA (US); Michael A. Menendez, Vashon, WA (US); Christopher R. Ching, Los Angeles, CA (US); Raul G. Podesta, La Plata (AR)

(73) Assignee: VOLTA CHARGING, LLC, San Francisco, CA (US)

(21) Appl. No.: 29/771,060

(22) Filed: Feb. 19, 2021

Related U.S. Patent Documents

Reissue of:
(64) Patent No.: Des. 844,559
Issued: Apr. 2, 2019
Appl. No.: 29/441,028
Filed: Dec. 31, 2012

U.S. Applications:
(62) Division of application No. 29/707,818, filed on Oct. 1, 2019, now Pat. No. Re. 48,500, which is an application for the reissue of Pat. No. Des. 844,559.

(51) LOC (13) Cl. ..... 13-02
(52) U.S. Cl.
USPC ..... D13/107
(58) Field of Classification Search
USPC ..... D13/107–110, 118–119, 184; D14/251, D14/253, 432, 434
CPC ..... Y02E 60/12; Y02T 90/14; Y02T 90/122; Y02T 90/128; Y02T 90/163; H02J 7/025; H02J 7/0042; H02J 7/0044; H02J 7/0045; H02J 7/0003; H02J 7/0027; H02J 7/0013; H02J 7/0054; H02J 7/00; H02J 2001/008; H02J 3/32; H02J 3/008; H01F 38/14; H01R 13/6675; H01M 2/1022; H01M 2/1055; H01M 10/44; H01M 10/46; H01M 10/425; B60L 11/182; B60L 11/1809; B60L 11/1861; B60R 16/03
See application file for complete search history.

(56) References Cited

U.S. PATENT DOCUMENTS

| | | | | | |
|---|---|---|---|---|---|
| D273,580 | S | * | 4/1984 | Riumbau | D13/107 |
| D459,234 | S | | 10/2002 | Kajiura | |
| 6,459,234 | B2 | | 10/2002 | Kajiura | |
| D507,813 | S | * | 7/2005 | Gillard | D20/19 |
| D542,849 | S | * | 5/2007 | Hill et al. | D20/10 |
| D608,733 | S | | 1/2010 | Smith | |
| D608,734 | S | | 1/2010 | Smith | |
| D613,683 | S | | 4/2010 | Baxter et al. | |
| D618,168 | S | | 6/2010 | Baxter et al. | |
| D618,204 | S | | 6/2010 | Andre et al. | |
| D626,063 | S | | 10/2010 | Cutter et al. | |
| D626,064 | S | | 10/2010 | Cutter et al. | |
| D626,065 | S | | 10/2010 | Cutter et al. | |
| D633,908 | S | | 3/2011 | Akana et al. | |
| D637,553 | S | | 5/2011 | Shin | |
| D644,218 | S | | 8/2011 | Akana et al. | |
| D646,269 | S | * | 10/2011 | Crick et al. | D14/307 |
| D647,053 | S | | 10/2011 | Gotou et al. | |
| D654,430 | S | | 2/2012 | Demers et al. | |
| D654,857 | S | | 2/2012 | Salazar et al. | |
| D654,858 | S | | 2/2012 | Salazar et al. | |
| D654,860 | S | | 2/2012 | Holthusen | |
| D654,861 | S | | 2/2012 | Holthusen | |
| D659,635 | S | | 5/2012 | Hou et al. | |
| D664,086 | S | | 7/2012 | Chin-Ho Kim et al. | |
| D664,087 | S | | 7/2012 | Chin-Ho Kim et al. | |
| D664,089 | S | | 7/2012 | Chin-Ho Kim et al. | |
| D669,071 | S | | 10/2012 | Akana et al. | |
| D674,334 | S | * | 1/2013 | Cutter et al. | D13/107 |
| D691,208 | S | * | 10/2013 | Gorelick | D20/10 |
| D696,658 | S | * | 12/2013 | Winston et al. | D14/307 |
| D708,573 | S | * | 7/2014 | Gieniec et al. | D13/107 |
| D712,349 | S | * | 9/2014 | Ahlgren | D13/107 |
| D720,285 | S | * | 12/2014 | Gilomen | D13/107 |
| D729,157 | S | * | 5/2015 | Gilomen | D13/107 |
| D730,822 | S | * | 6/2015 | Chin-Ho Kim | D13/107 |
| D733,647 | S | * | 7/2015 | Farrell | D13/107 |
| D749,503 | S | * | 2/2016 | Ferguson | D13/107 |
| 9,325,182 | B2 | * | 4/2016 | Venkataraman | B60L 53/30 |
| D771,562 | S | * | 11/2016 | Dolle | D13/107 |
| D777,101 | S | * | 1/2017 | Shimada | D13/107 |
| D778,818 | S | * | 2/2017 | Bruining | D13/107 |
| 9,705,346 | B2 | * | 7/2017 | Bonwit | B60L 53/305 |
| D816,077 | S | * | 4/2018 | Benic | D14/307 |
| D833,387 | S | * | 11/2018 | Baxter | D13/107 |

(New)

| | | | | | |
|---|---|---|---|---|---|
| D838,668 | S | * | 1/2019 | Westfall | D13/107 |
| D842,242 | S | * | 3/2019 | Zhang | D13/107 |
| D844,559 | S | | 4/2019 | Mercer et al. | |
| D858,435 | S | * | 9/2019 | Helnerus | D13/107 |
| D868,687 | S | * | 12/2019 | da Silva | D13/107 |
| D872,687 | S | * | 1/2020 | Mortun | D13/107 |
| D876,342 | S | * | 2/2020 | Mercer | D13/107 |
| D876,345 | S | * | 2/2020 | Mercer | D13/107 |
| D876,346 | S | * | 2/2020 | Mercer | D13/107 |
| D883,199 | S | * | 5/2020 | Santander | D13/107 |
| D884,613 | S | * | 5/2020 | Minkyo | D13/107 |
| 2010/0296234 | A1 | * | 11/2010 | Crick, Jr. | 361/679.21 |
| 2011/0145141 | A1 | * | 6/2011 | Blain | 320/109 |
| 2012/0262112 | A1 | | 10/2012 | Ross | |
| 2013/0069588 | A1 | * | 3/2013 | Oda et al. | 320/109 |
| 2013/0207606 | A1 | * | 8/2013 | Ranga et al. | B60L 53/31 320/109 |

OTHER PUBLICATIONS

Parsons, Sarah. "France Announces $2.2 Billion Electric car Charging Network." [retrieved on Dec. 28, 2012]. Retrieved from the Internet: <www.google. com/imgres?q=electric+vehicle-Fcharging+stations&num=10&um=1&h1=en&tbo=d&biw=1440&bih=783&tbm=isch&tbnid=QP2cslOfm0K2MAimgrefurl=http://inhabitat.com/massachusetts-set-to-install-100-ev-charging-stations/&docid=NKQtedu9SWSKBM&imgurl=http://assets.inhabitat.com/wp-content/uploads/>.

Smartlet Coulomb Charging Station. [retrieved Nov. 7, 2012]. Retrieved from the Internet: <www.google.com/imgres?q=electnc+vehicle+charging+stations&num=10&um=1&h1=en&tbo=d&biw=1440&bih=783&tbm=isch&tbnid=RKicGBKiRP2P7M:&imgrefurl=http://news.cnet.com/8301-11128_3-10167445-54.html&docid=CWP1h-N1014k3M&imgurl=http://news.cnet.com/i/oto/20090219/smartlet_Coulomb_charging_station-cityhall_270x407.

Bloomfield, Nikki Gordon. "Need An Electric Car Charging Station At Work?Here's One For Free." [retrieved Nov. 7, 2012]. Retrieved from the Internet: <www.google.com/imgres?q-electric+vehicle-Fcharging+stations&start=22&num=10&um=l&h1=en&tbo=d&biw=1440&bih=783&tbm=isch&tbnid=njkABIvYoMe0IM:&imgrefurl=http://www.greencarreports.com/news/1079118_need-an-electric-car-charging-station-at-work-heres-one-for-free&docid=7ywn-IMbSk0AgM&imgurl=http://images.thecarconnection.com/smUchargepoint_100182292_s. n>.

"Smart Grids, Fast Charging—Infrastructure for Electric Car." [retrieved on Nov. 7, 2012]. Retrieved from the Internet: <www.google.com/imgres? q=electric+vehicle+charging+stations&start=20&num=10&um=l&h1=en&tbo=d&biw=1440&bih=783&tbm=isch&tbnid=f4piNYxLOy80M:&imgrefurl=http://www.impactlab.net/2008/07/28/smart-grids-fast-charging-infrastructure-for-electric-cars/&docid=3pBfeFHp7Jg9mM&imgurl=http://www.impactlab.com/wp-content/uploads/2008/07/charging-station-london>.

"EV News: first hotel to install electric car charging station for guests." [retrieved on Nov. 7, 2012]. Retrieved from the Internet: <www.google.com/ imgres?q-electric+vehicle+charging+stations&start=307&num=10&um=l&h1=en&tbo=d&biw=1440&bih=783&tbm=isch&tbnid=78HBWHajq0_ydM:&imgrefurl=http://www.examiner.com/article/ev-news-first-hotel-to-install-electric-car-charging-station-for-guests&docid=Hv6RWgv08bpOOM&imgurl=http://www.examiner.com/images/blog/wysiwyg/image/>.

"EV Charging Station, Volta—Honolulu, Hawaii." [retrieved on Dec. 30, 2012]. Retrieved from the Internet: <www.google.com/imgres?q=electric+vehicle -Fcharging+stations&start=307&num=10&um=l&h1=en&tbo=d&biw=1440&bih=783&tbm=isch&tbnid=78HBWHajq0_ydM:&imgrefurt=http://www.examiner.com/article/ev-news-first-hotel-to-install-electric-car-charging-station-for-guests&docid=Hv6RWgv08bpOOM&imgurl=http://www.examiner.com/images/blog/wysiwyg/image/>.

Buffalo Niagara Medical Campus. "Electric Vehicle Charging Stations Installed Across Campus." [retrieved on Dec. 30, 2012]. Retrieved from the Internet: <www.google.com/imgres?q=electric+vehicle-Fcharging+stations&start=554&um=1&h1=en&tbo=d&biw=14408bih=783&tbm=isch&tbnid=5QoChyg4wMwOeM:&imgrefurl=http://www.bnmc.org/electric-vehide-charging-stations-installed-across-campus/&docid=V1NctdKztXxtKM&imgurl=http://www.bnmc.org/wp-content/uploads/charging-stations>.

"Electric-Vehicle Charging Stations Available at ACC Campuses." [retrieved Dec. 30, 2012]. Retrieved from the Internet: <www.google.com/imgres?q=electnc +vehicle+charging+stations&start=738&um=1&hl=en&tbo=d&biw=1440&bih=783&tbm=isch&tbnid=BCVZxvxp_xJfmM:&imgrefurl=http:Mnsideacc.ausfincc.edu/index.php/2012/01/13/electric-vehicle-charging-stations-available-at-acc-campuses/&docid=WIRnei31J_vhM&imgurl=http://insideacc.austincc.edu/wp-content/uploads/HBC-Charging-Station>.

Stewart, Douglas. "On the Same Day . . . Doe Ramps up Electric Vehicle Information; Costco removes EV chargers "No one uses"them." [retrieved on Nov. 7, 2012], Retrieved from the Internet: < www.google.com/imgres?q=electric+vehicle+charging+stations&num=10&um=l& hl=en&tbo=d&biw=1440&bih=783&tbm=isch&tbnid=fy1RBJOdzLlwDM:&imgrefurl= http://ameristroika.wordpress.com/2011/08/30/on-the-same-day-doe-ramps-up-electric-vehicle-information-costco-removes-ev-chargers-no-one-uses-them/&docid=z4L5TL-rLf6l2M&imgurl=http://ameristroika.files.wordpress.com/2011/08/ev-recharging-station1>.

"Top 20 electric vehicle charging station companies." [retrieved Nov. 7, 2012]. Retrieved from the Internet: <www.google.com/imgres?q=electnc+vehicle+charging+stations&start=22&num=10&um=1&h1=en&tbo=d&biw=1440&bih=783&tbm=isch&tbnid=Xkyb5eDD_qzaxM:&imgrefurl=http://www.evcarco.com/evcarco/2012/01/27/ev-industry-charing-station-trends-united-states/&docid=kQyau38F05amJM&imgurl=http://www.evcarco.com/evcarco/wp-content/uploads/2012/01/EV-Charg ing-Station-fast>.

"Singapore: Robert Bosch appointed to set up EV charging station infrascture." [retrieved on Dec. 30, 2012], Retrieved from the Internet: <www.google.com/imgres?q=electric+vehicle-Fcharging+stations&start=59&num=10&um=l&h1=en&tbo=d&biw=1440&bih=783&tbm=isch &tbnid=zbLiKh-Op70WnM:&imgrefurl=http://theenergycollective.com/sklowem/44983/singapore-robert-bosch-appointed-set-ev-charging-station-infrastructure&docid=LNEAMWIerfHiDM&imgurl=http://lh5.ggpht.comLBgmD4flG MVc/TK_7eL5lPWl/AAAAAAAAEeb>.

Campus Life Services. "Charge your vehicle with us." [retrieved on Dec. 30, 2012]. Retrieved from the Internet: <www.google.com/imgres?q=electric+vehicle-Fcharging+stations&start=713&um=1&h1=en&tbo=d&biw=1440&bih=783&tbm=isch&tbnid=9kS7R5ujBHDTOM:&imgrefurl=http://campuslifeservices.ucstedukls/16.784&docid=YUOFyHbLzoddxMimgurl=http://campuslifesevices.ucsf.edu/upload/ cls/body_images/EV_2_car_charge_unite300jpg&w300&h=400&ei=GmqZULy1LysSx0AG—4 CoDA&zoom=l&iact=hc&vpx=595&vpy=11&dur=8286&hovh=259&hu >.

University of Maryland: The Department of Transportation Services. "About Electric Vehicle Charging Stations." [retrieved on Nov. 7, 2012], Retrieved from the Internet: <http://www.google.com/imgres?q=electric+vehicle+charging+kiosk&um=1&h1=en&tbo=d&biw=813&bih=453&tbm=isch&tbnid=s6QZ c2vv4M1g-MAimgrefurl=http://www.transportafion.umd.edu/chargingstafion.html&docid=DuYNDCLIkGewXM&imgurl=http://www.transportation.umd.edu/images/charging-station.png&w=230&h=320&ei=dGuZUK3sL9060AGz9oHIDw&zoom=1&iact=hc&vpx=498&vpy=59&dur=3576&hovh=256Ma>.

Moon, Jade. "Getting An EV Chargefor Free." [retrievedon Dec. 30, 2012]. Retrieved from the Internet: <www.google.com/imgres7q-electric-Fvehicle+charging+kiosk&um=1&h1=en&tbo=d&biw=813&bih=453&tbm=isch&tbnid=spbp BxbTvGDwlMAimgrefurl=http://www.midweek.com/getting-an-ev-charge-for-free/&docid=Wh1DDUhKhM7U1M&imgurl=http://www.midweek.com/wp-conent/uploads/2012/04/moon.jpg&w=300&h=199&ei=dGuZUK3sL9060AGz9oHIDw&zoom=1&iact=hc&vpx=4&vpy=185&dur=3366&hovh=159&hou>.

Electric Vehicle Kiosk, [retrieved on Dec. 7, 2012], Retrieved from the Internet: <www.google.com/imgres?q=electric+vehicle+charging+kios k&um=l&h1=en&tbo=d&biw=813&bih=453&tbm=isch&tbnid=19Qs24hR5V2X AM:&imgrefurl=http://article.wn.com/view/2012/04/04/OpConnect_Leads_the_Way_With_Social_MediaEnabled_Electric_Ve/&docid=GswMh lig P_2aVM&imgurl=http:M.ytimg.com/vi/Sd F4WoQqkYY/0. jpg&w=480&h=360&ei=dGuZUK3sL9060AGz9oHIDw&zoom=1&iact=hc&vpx=530&vpy=17&dur=10132&hovh=19441>.

* cited by examiner

*Primary Examiner* — Darlington Ly
(74) *Attorney, Agent, or Firm* — Morgan, Lewis & Bockius LLP

(57) CLAIM

The ornamental design for an electric vehicle charging system, as shown and described.

DESCRIPTION

*Notice: More than one reissue application has been filed for the reissue of U.S. Design Pat. No. D. 844,559, issued on Apr. 2, 2019. The reissue applications are the present application and Ser. No. 29/707,818, filed on Oct. 1, 2019, all of which are reissues of U.S. Pat. No. D. 844,559.*
*This application is a Divisional of U.S. patent application Ser. No. 29/707,818 filed Oct. 1, 2019, which is an application for reissue of U.S. Design Pat. No. D. 844,559, which issued on Apr. 2, 2019 from U.S. Design application Ser. No. 29/441,028 filed on Dec. 31, 2012, each of which is incorporated herein by reference in its entirety.*
[FIG. 1 is an upper left front perspective view of an electric vehicle charging system showing our new design;]
[FIG. 2 is an upper right rear perspective view thereof;]
[FIG. 3 is a front elevational view thereof;]
[FIG. 4 is a right side elevational view thereof;]
[FIG. 5 is a rear elevational view thereof;]
[FIG. 6 is a left side elevational view thereof;]
[FIG. 7 is a top plan view thereof;]
[FIG. 8 is a bottom plan view thereof;]
[FIG. 9 is a top left from perspective cutaway view showing illumination elements;]
[FIG. 10 is a side and enlarged elevational cutaway view of the electric vehicle charging system of FIGS. 4 and 6; and,]
[FIG. 11 is an enlarged bottom plan view showing details of air vents of the electric vehicle charging system of FIG. 8.]
*FIG. 12 is an upper left front perspective view of a second embodiment of an electric vehicle charging device showing our new design;*
*FIG. 13 is an upper right rear perspective view thereof;*
*FIG. 14 is a front elevational view thereof;*
*FIG. 15 is a right side elevational view thereof;*
*FIG. 16 is a rear elevational view thereof;*
*FIG. 17 is a left side elevational view thereof;*
*FIG. 18 is a top plan view thereof;*
*FIG. 19 is a bottom plan view thereof;*
*FIG. 20 is a top left from perspective cutaway view;*
*FIG. 21 is a side and enlarged elevational cutaway view of the electric vehicle charging device of FIG. 17; and,*
*FIG. 22 is an enlarged bottom plan view showing details of the electric vehicle charging device of FIG. 19.*
[The shade lines in the Figures show contour and not surface ornamentation.]
The broken lines in the Figures show portions of the electric vehicle charging [system] *device* which [forms] *form* no part of the claimed design.

1 Claim, 10 Drawing Sheets

Figure 1:
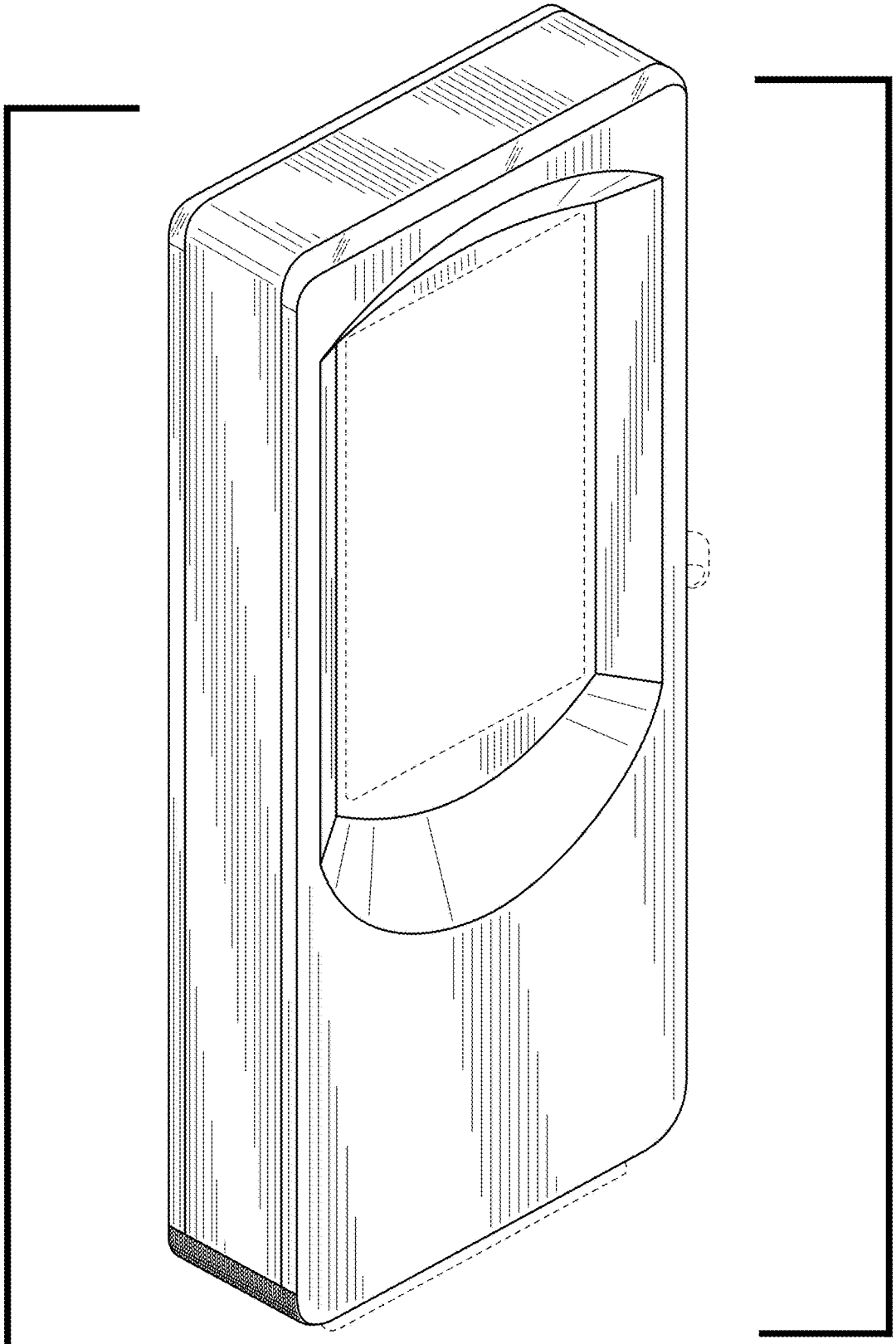
Figure 2:
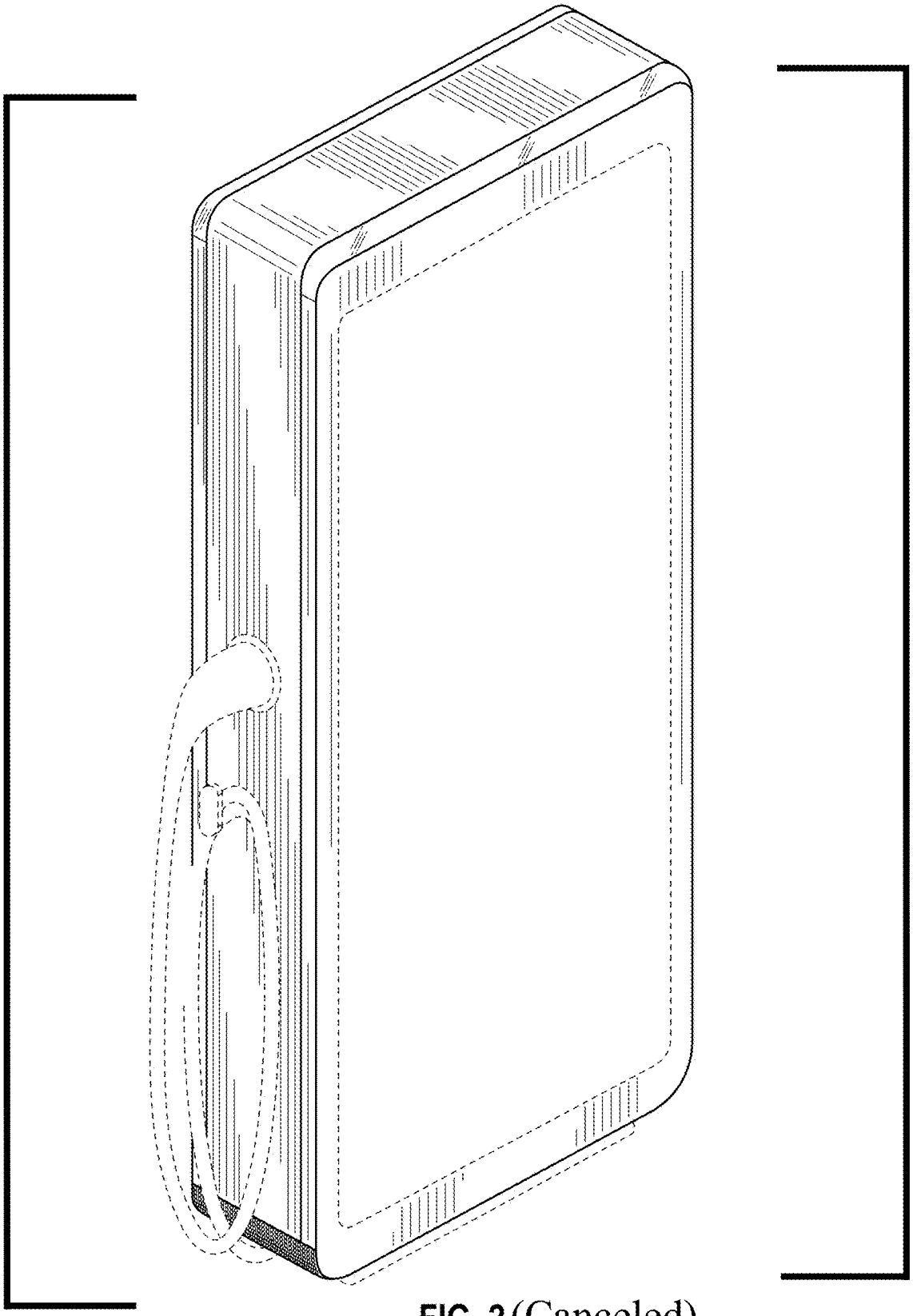
Figure 3:
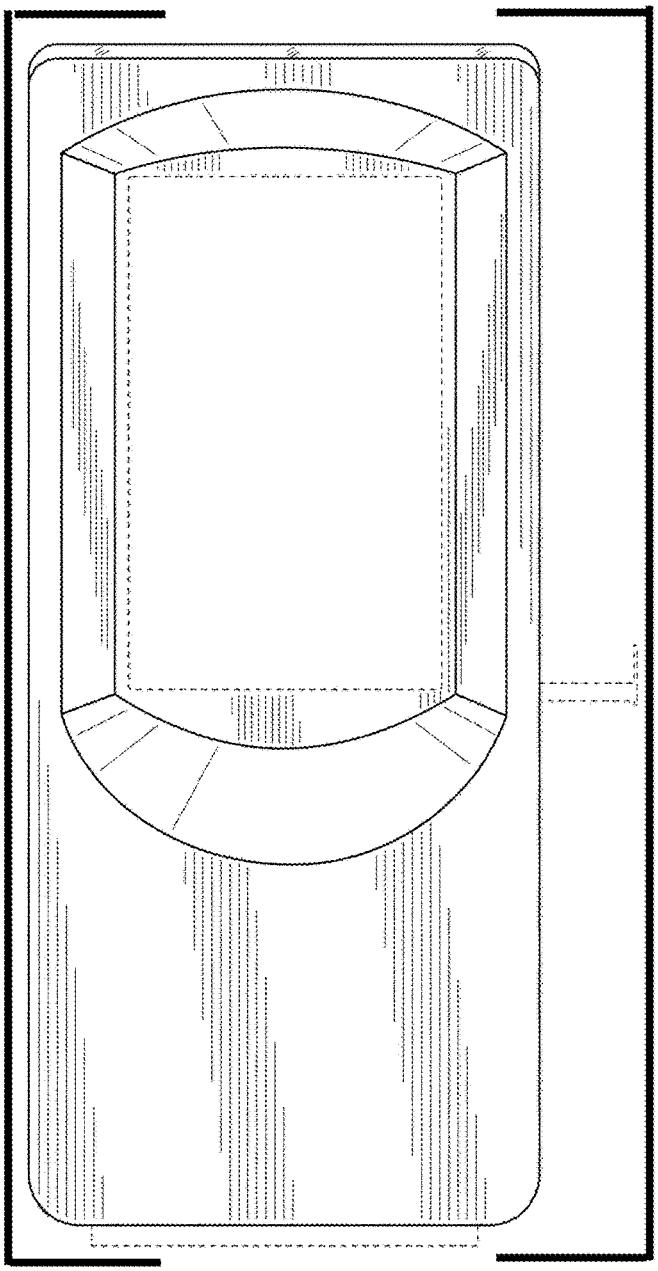
Figure 4:
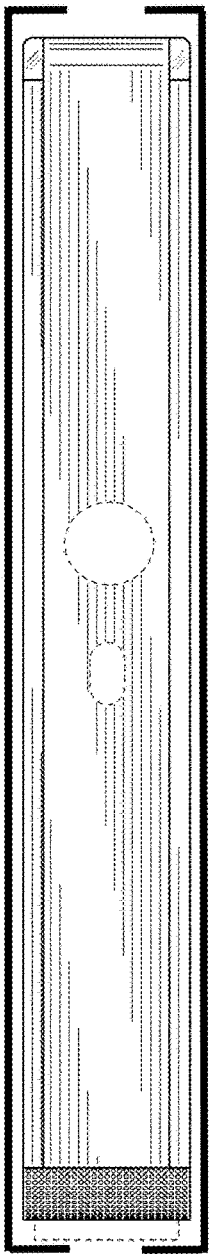
Figure 7:
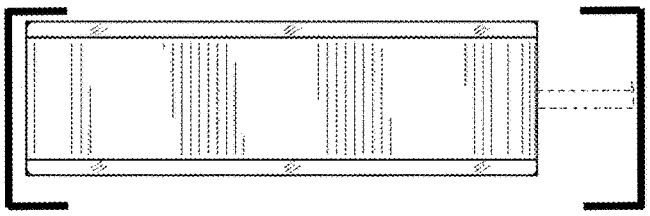
Figure 5:
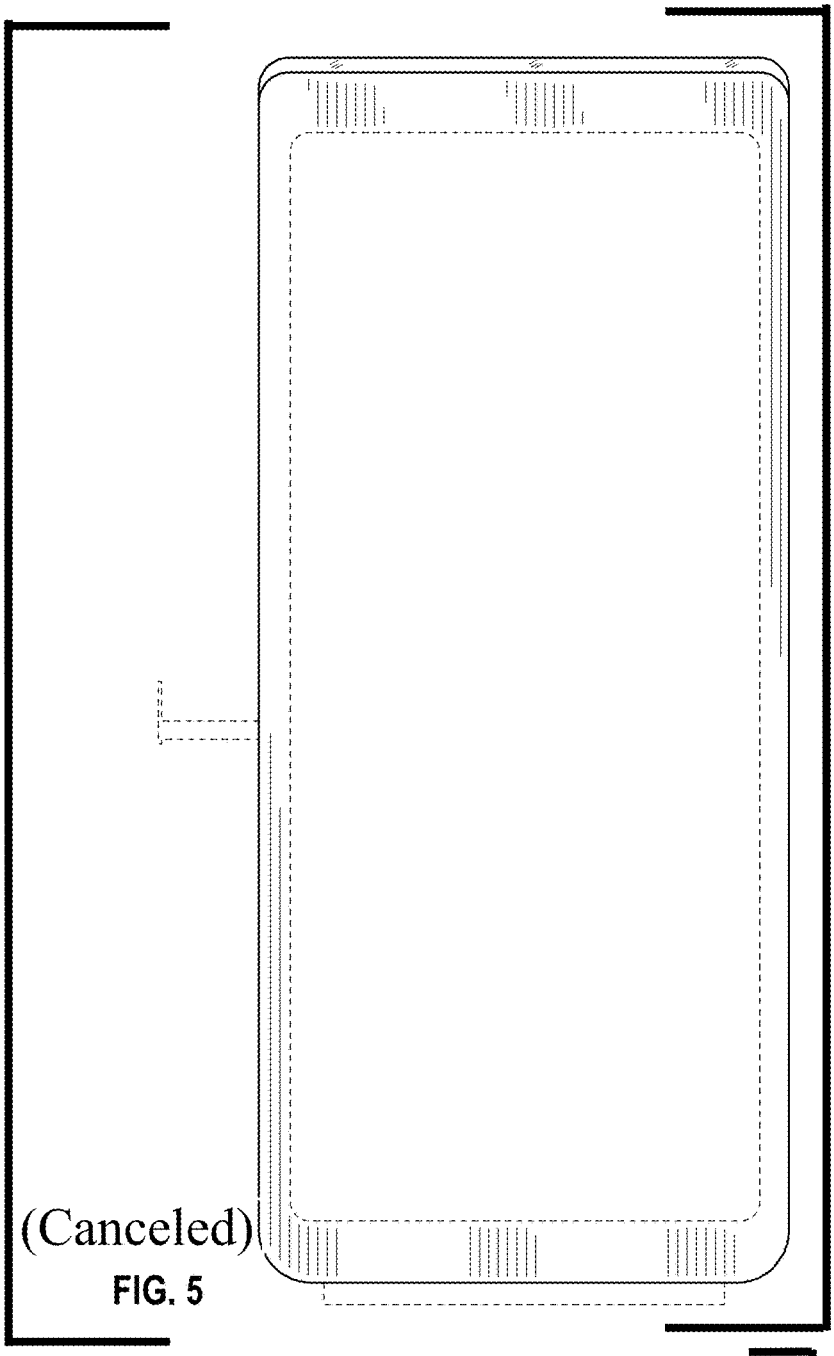
Figure 6:
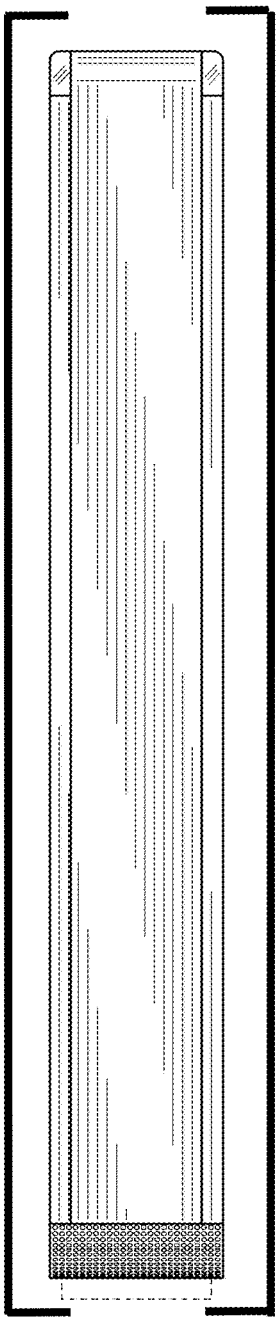
Figure 8:
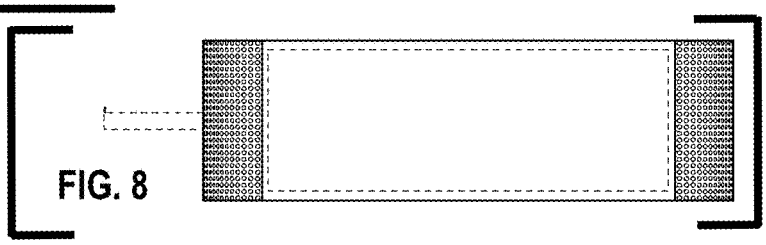

Matter enclosed in heavy brackets [ ] appears in the original patent but forms no part of this reissue; matter printed in italics indicates the additions made by reissue.

FIG. 1 (Canceled)

FIG. 2 (Canceled)

(Canceled)

(Canceled)

(Canceled)

(Canceled)

(Canceled)

(Canceled)

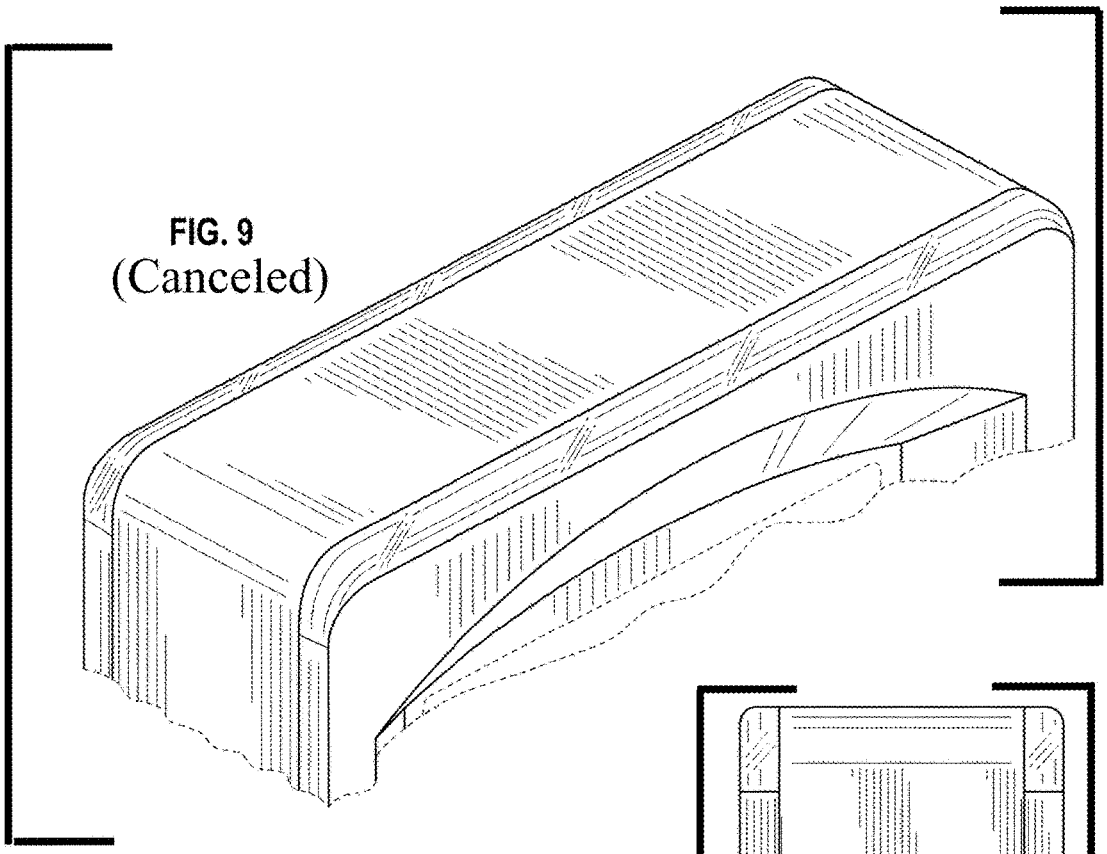
FIG. 9
(Canceled)
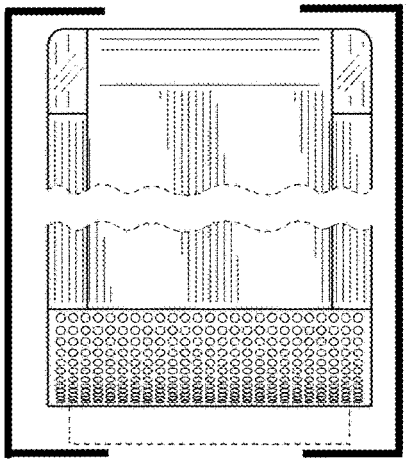
FIG. 10
(Canceled)
(Canceled)
FIG. 11
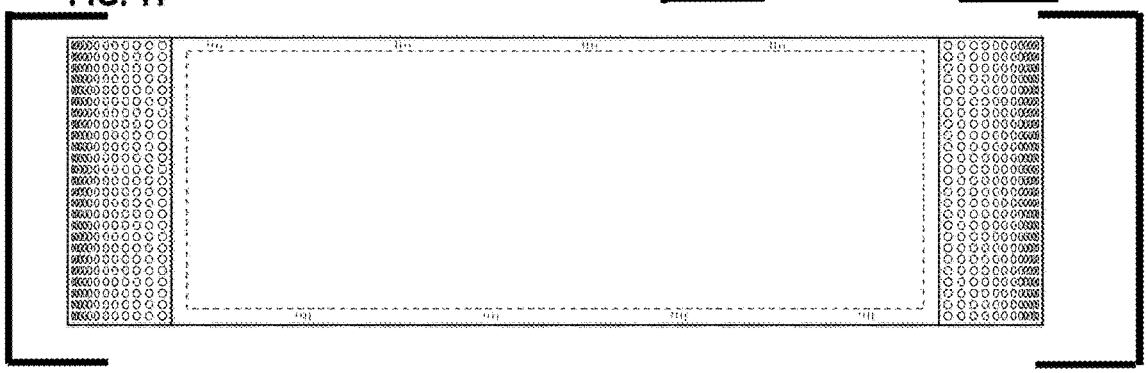

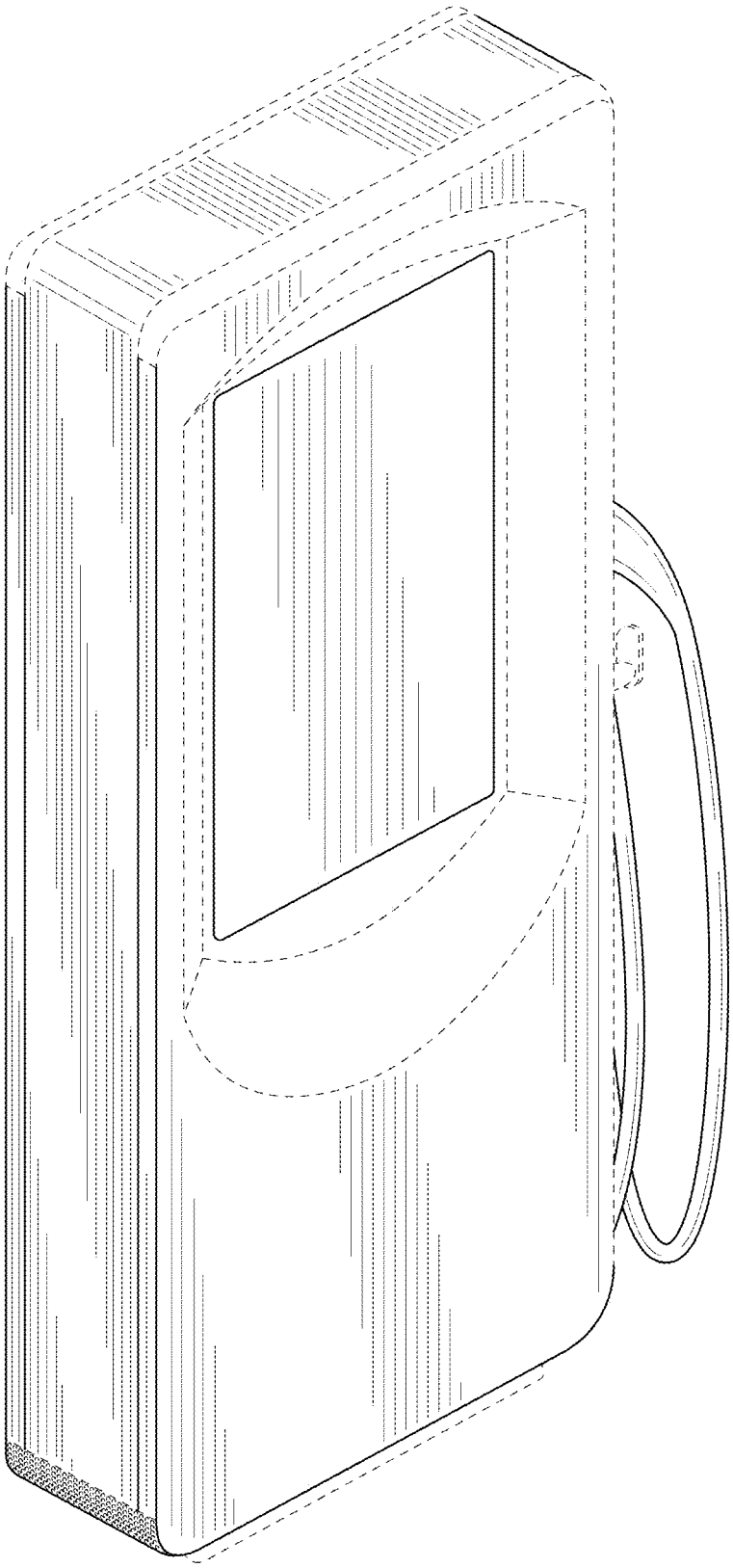
FIG. 12 (New)

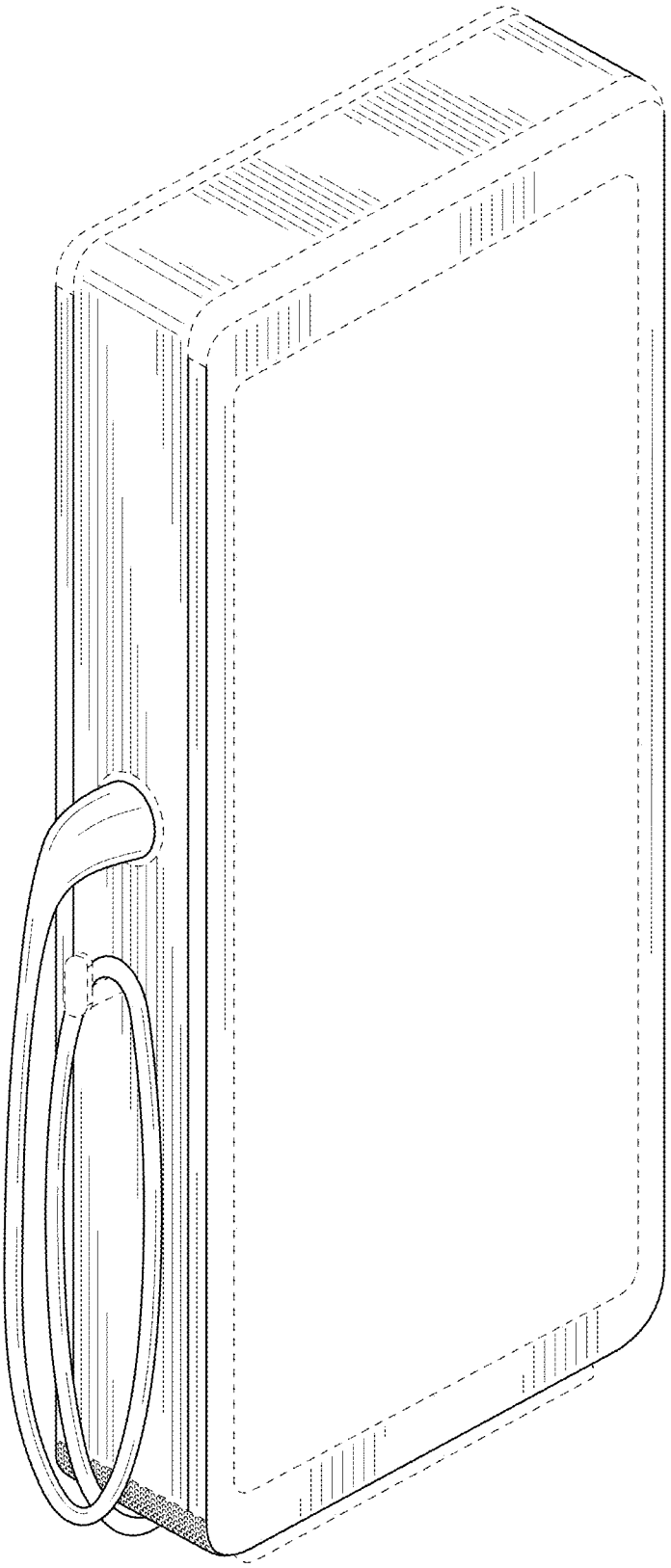
FIG. 13 (New)

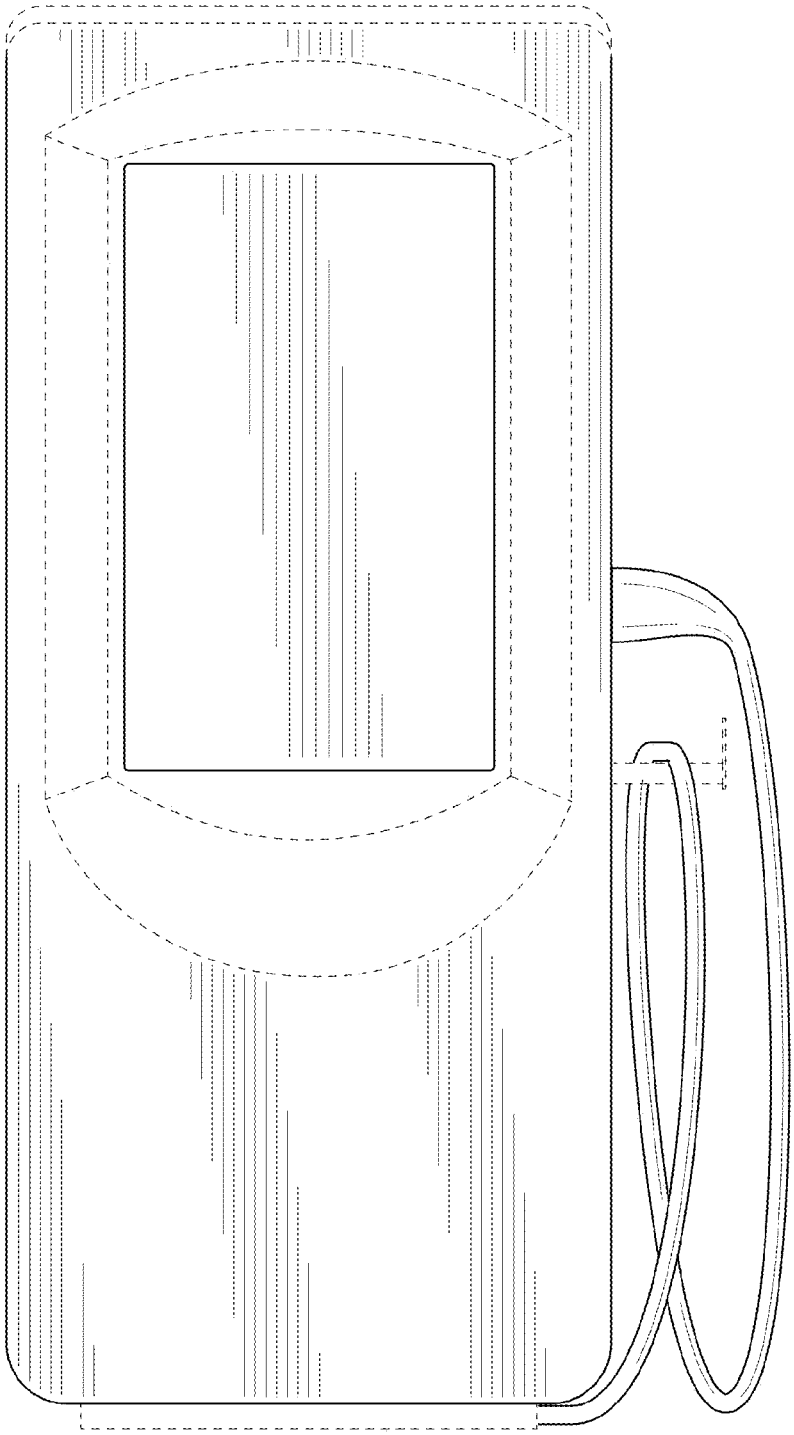
FIG. 14 (New)
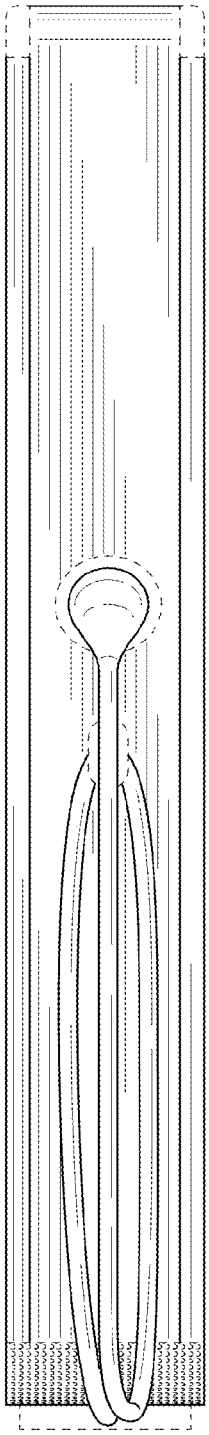
FIG. 15 (New)
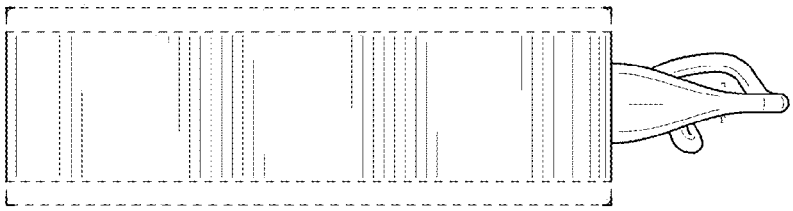
FIG. 18 (New)

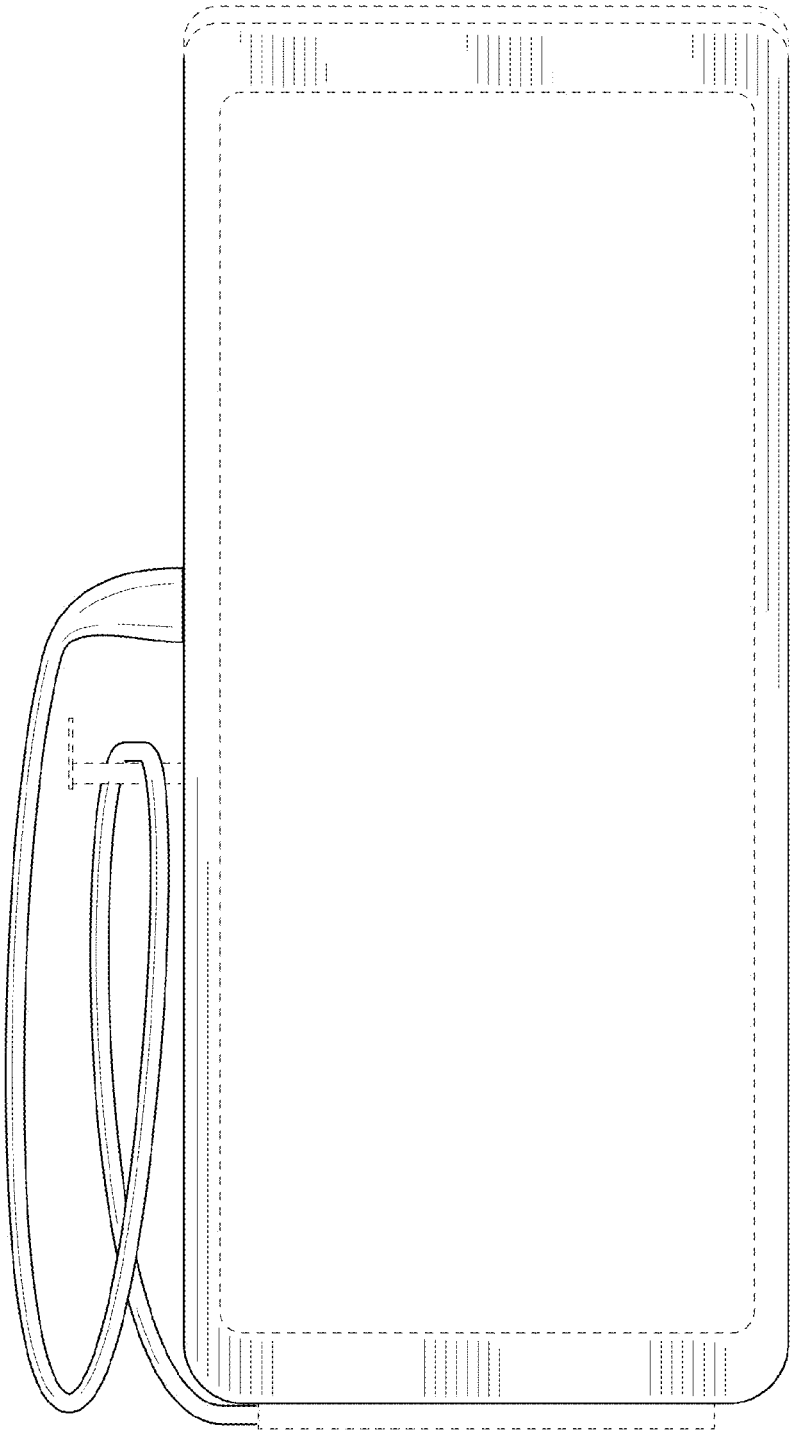
FIG. 16 (New)
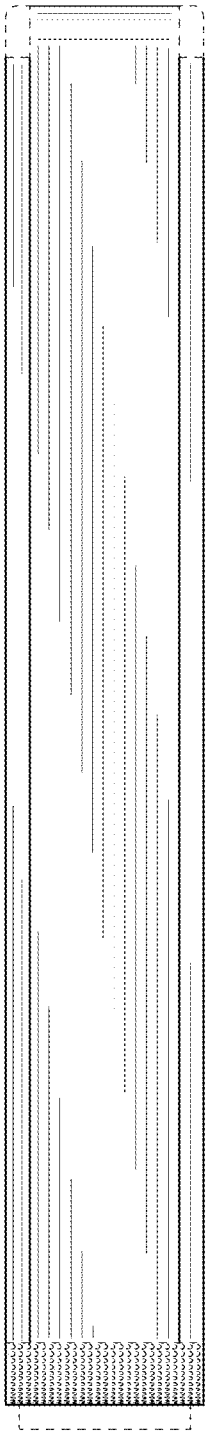
FIG. 17 (New)
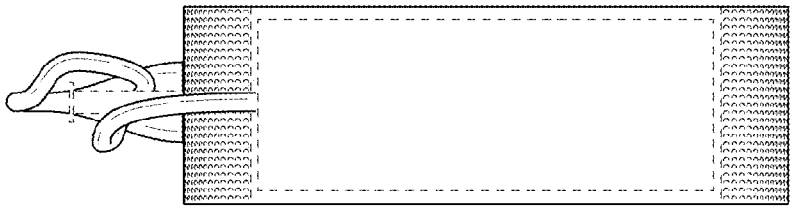
FIG. 19 (New)

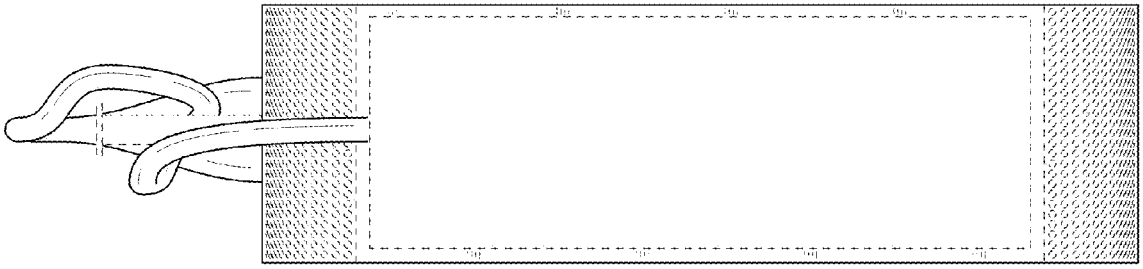

FIG. 20 (New)
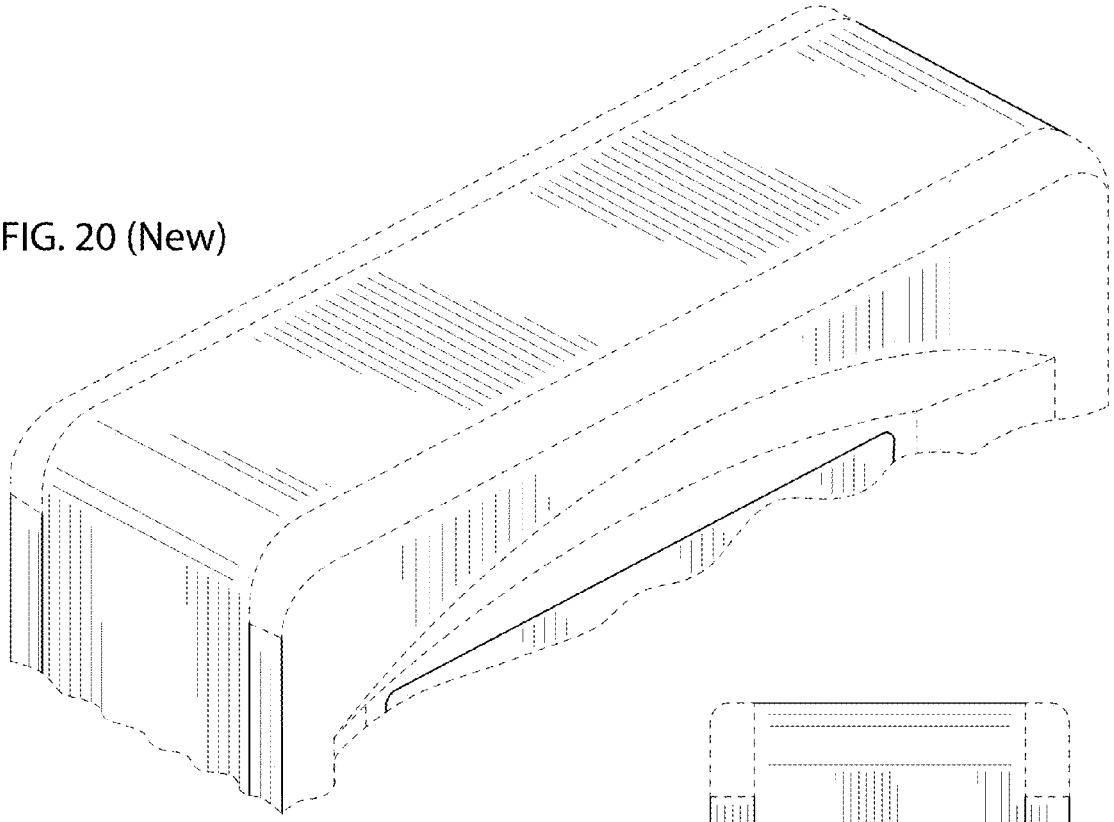
FIG. 21 (New)
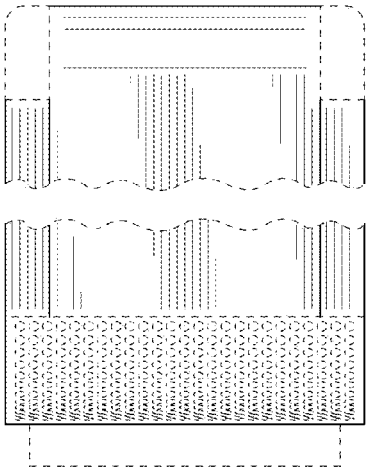
FIG. 22 (New)